United States Patent
Cakulev et al.

(10) Patent No.: US 12,408,054 B2
(45) Date of Patent: Sep. 2, 2025

(54) SYSTEMS AND METHODS FOR QUALITY OF SERVICE MONITORING ACTIVATED BY POLICY CONTROL FUNCTION

(71) Applicant: Verizon Patent and Licensing Inc., Basking Ridge, NJ (US)

(72) Inventors: Violeta Cakulev, Millburn, NJ (US); Lixia Yan, Basking Ridge, NJ (US); Sudhakar Reddy Patil, Flower Mound, TX (US); Anthony Clay Reynolds, Rhome, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 606 days.

(21) Appl. No.: 17/809,827

(22) Filed: Jun. 29, 2022

(65) Prior Publication Data
US 2024/0007880 A1    Jan. 4, 2024

(51) Int. Cl.
| | |
|---|---|
| *H04W 24/08* | (2009.01) |
| *H04L 43/0829* | (2022.01) |
| *H04L 43/0852* | (2022.01) |
| *H04L 43/0864* | (2022.01) |
| *H04L 43/087* | (2022.01) |
| *H04L 43/0888* | (2022.01) |
| *H04W 24/10* | (2009.01) |

(52) U.S. Cl.
CPC ......... *H04W 24/08* (2013.01); *H04L 43/0829* (2013.01); *H04L 43/0858* (2013.01); *H04L 43/0864* (2013.01); *H04L 43/087* (2013.01); *H04L 43/0888* (2013.01); *H04W 24/10* (2013.01)

(58) Field of Classification Search
CPC .. H04W 24/08; H04W 24/10; H04L 43/0829; H04L 43/0858; H04L 43/0864; H04L 43/087; H04L 43/0888
See application file for complete search history.

(56) References Cited

U.S. PATENT DOCUMENTS

| | | | |
|---|---|---|---|
| 2020/0053757 A1* | 2/2020 | Bagheri | H04L 5/10 |
| 2020/0100299 A1* | 3/2020 | Loehr | H04W 72/0446 |
| 2020/0336872 A1* | 10/2020 | Basu Mallick | H04W 4/029 |
| 2020/0337083 A1* | 10/2020 | Loehr | H04W 72/1263 |
| 2020/0396024 A1* | 12/2020 | Ganesan | H04L 1/1864 |
| 2021/0058905 A1* | 2/2021 | Ganesan | H04L 5/0014 |
| 2021/0076192 A1* | 3/2021 | Wu | H04L 67/535 |
| 2021/0084586 A1* | 3/2021 | Loehr | H04W 76/28 |

(Continued)

FOREIGN PATENT DOCUMENTS

WO   WO-2022022345 A1 *  2/2022

OTHER PUBLICATIONS

English Machine translation of WO 2022022345 (Year: 2021).*

*Primary Examiner* — Ajay Cattungal

(57) ABSTRACT

A device may include a processor configured to determine that Quality of Service (QoS) monitoring is to be performed for a communication session; generate a QoS monitoring policy for the communication session; and provide the QoS monitoring policy to a Session Management Function (SMF) associated with the communication session. The processor may be further configured to receive a QoS monitoring report for the communication session from the SMF and perform an action based on the received QoS monitoring report.

20 Claims, 9 Drawing Sheets

(56) References Cited

U.S. PATENT DOCUMENTS

2023/0246724 A1* 8/2023 Pateromichelakis ........................ H04W 72/0453 370/329
2024/0224237 A1* 7/2024 Ganesan ............... H04W 72/02

* cited by examiner

SYSTEMS AND METHODS FOR QUALITY OF SERVICE MONITORING ACTIVATED BY POLICY CONTROL FUNCTION

BACKGROUND INFORMATION

To satisfy the needs and demands of users of mobile communication devices, providers of wireless communication services continue to improve and expand available services and networks used to deliver such services. One aspect of such improvements includes the development of wireless access networks and options to utilize such wireless access networks. For example, a wireless access network may need to manage a large number of communication sessions. Maintaining a large number of communication sessions may pose various challenges.

DETAILED DESCRIPTION OF EMBODIMENTS

Figure 1:
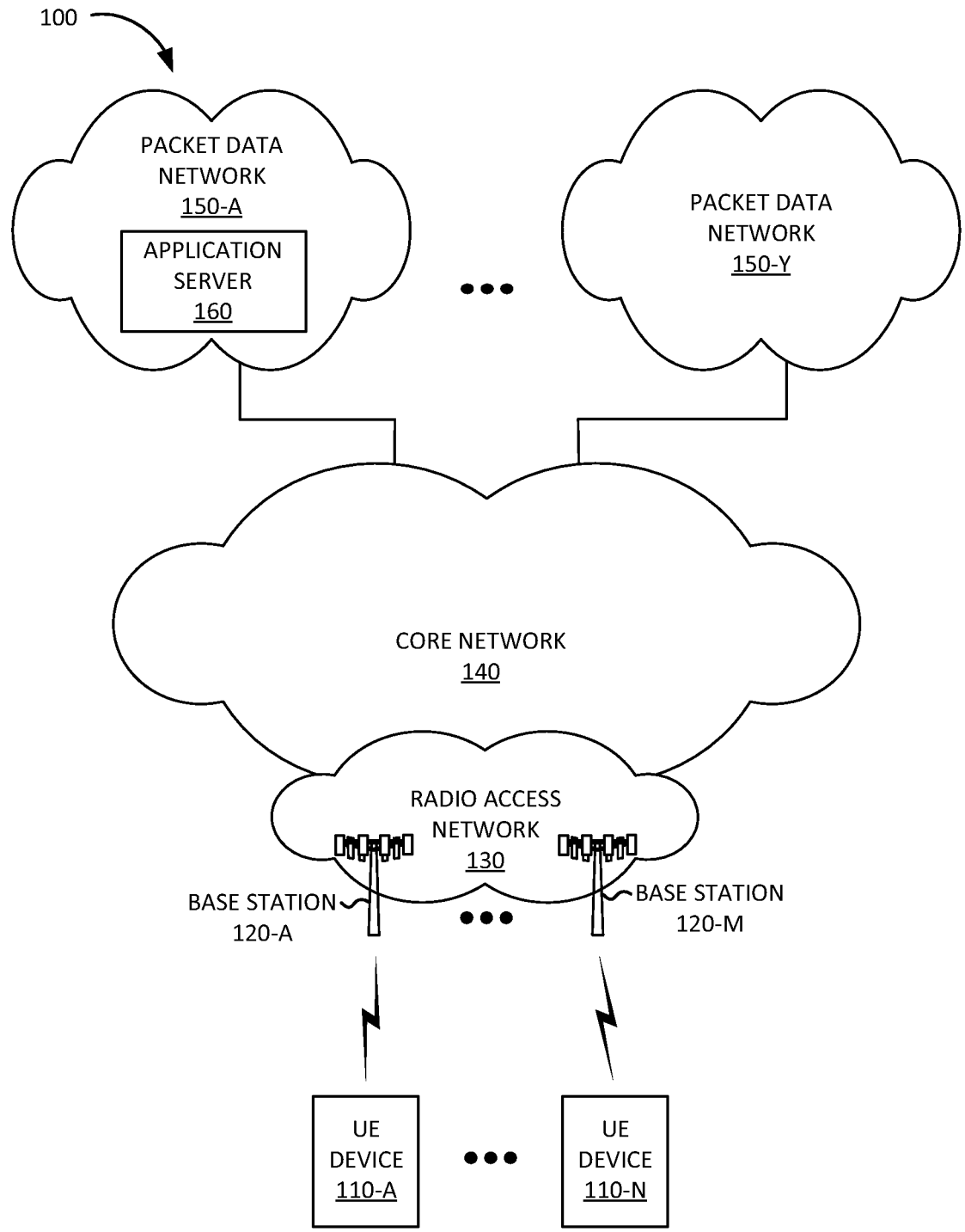
FIG. 1 illustrates an environment according to an implementation described herein.

The following detailed description refers to the accompanying drawings. The same reference numbers in different drawings identify the same or similar elements.

Wireless network, such as Fourth Generation (4G) wireless networks, Fifth Generation (5G) wireless networks, and/or other types of wireless networks, continue to add new users and manage an increasing number of communication sessions. A communication session, associated with a user equipment (UE) device attached to a 4G or 5G core network via a Radio Access Network (RAN), may provide Internet Protocol (IP) and/or other kind of connectivity between the UE device and an application server in a network, another UE device, and/or another type of device.

A 5G core network may implement different types of services, such as, for example, an enhanced Mobile Broadband (eMBB) service for Voice over Internet Protocol (VoIP) telephone calls and/or data sessions for accessing Internet websites; a massive Internet of Things (IoT) service for IoT devices; an Ultra-Reliable Low Latency Communication (URLLC) service for devices such as medical monitoring devices, autonomous vehicles, industrial automation, etc.; and/or other types of wireless communication services.

Different services may have different Quality of Service (QoS) requirements. A core network may define QoS monitoring to measure one or more QoS parameters for a communication session in real-time. For example, a Policy Control Function (PCF) may activate a QoS monitoring policy on a data flow for a communication session, in response to a request from an Application Function (AF) or a Network Exposure Function (NEF). The PCF may provide the QoS monitoring policy to a Session Management Function (SMF). In response, the SMF may send a QoS monitoring request to a User Plane Function (UPF) associated with the communication session. The UPF may obtain data for QoS parameters and report the obtained data to the SMF based on a frequency specified by QoS monitoring request. The SMF may then in turn report the QoS monitoring results to the PCF based on a reporting frequency specified by the QoS monitoring policy and/or a configuration associated with the PCF.

Reporting QoS monitoring data may result in a significant number of signaling messages being sent in the network. In situations where immediate action in response to a QoS monitoring report is not needed, a mechanism to reduce signaling in the network may improve the efficiency of the network. In addition, a PCF may need to react to information included in a QoS monitoring report. For example, the PCF may need to adjust a QoS class for a communication session in response to information included in a received QoS monitoring report. In such situations, a mechanism to initiate QoS monitoring, which is independent of QoS monitoring triggered by requests from an AF or an NEF, may be needed for efficient functioning of the core network.

Implementations described herein relate to systems and methods for QoS monitoring triggered by a PCF and batch reporting of QoS monitoring reports. For example, a PCF in a 5G core network may be configured to determine that QoS monitoring is to be performed for a communication session, generate a QoS monitoring policy for the communication session in response, and provide the QoS monitoring policy to an SMF associated with the communication session. The QoS monitoring policy may instruct the SMF to measure values for at least one of an uplink delay (also referred to as latency), a downlink delay, a round-trip delay, a packet loss rate, a jitter rate, a throughput rate, and/or another QoS parameter associated with the communication session. The PCF may be further configured to receive a QoS monitoring report for the communication session from the SMF and perform an action based on the received QoS monitoring report.

The action may include sending the received QoS monitoring report to an AF, NEF, and/or other types of NFs. Additionally, or alternatively, the action may include applying a policy to the SMF based on the received QoS monitoring report, such as, for example, changing a QoS class for the communication session, instructing the SMF to collect additional QoS information relating to the communication session, instructing the SMF to transfer the communication session to a particular UPF, assigning the communication session to a particular network slice, and/or applying another type of policy to the communication session.

Determining that QoS monitoring is to be performed for the communication session may include at least one of: receiving, from a Charging Function (CHF), a notification indicating that QoS monitoring is to be performed for the communication session; receiving a subscriber profile update indicating that QoS monitoring is to be activated for communication sessions associated with a subscriber; determining that the communication session satisfies a trigger condition for activating QoS monitoring; determining that QoS monitoring is to be established for communication sessions associated with a particular Data Network Name (DNN) or Access Point Name (APN); determining that QoS monitoring is to be established for every communication session; and/or another type of determination.

Furthermore, the PCF may be configured to collect QoS monitoring reports from SMF s and provide the collected QoS monitoring reports to an AF and/or NEF in a batch report. For example, the PCF may be configured to generate a batch reporting rule that includes a reporting trigger condition, detect that the reporting trigger condition is satisfied, and send the batch report to the AF or NEF (and/or other types of NFs in core network 140), in response to detecting that the reporting trigger condition is satisfied. Detecting the reporting trigger condition may include at least one of detecting that a size of data included in the plurality of QoS monitoring reports has reached a data size threshold, detecting that a particular time period has elapsed, detecting that a particular number of QoS monitoring reports have been received for a particular subscriber, and/or detecting another type of reporting trigger condition has been satisfied.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), base stations 120-A to 120-M (referred to herein collectively as "base stations 120" and individually as "base station 120") in RAN 130, core network 140, and packet data networks (PDNs) 150-A to 150-Y (referred to herein collectively as "PDNs 150" and individually as "PDN 150").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV™, Google Chromecast™, Amazon Fire TV™, etc.), a WiFi access point, a smart television, etc.; a portable gaming system; a global positioning system (GPS) device; a home appliance device; a home monitoring device; and/or any other type of computer device with wireless communication capabilities and a user interface. In some implementations, UE device 110 may communicate using machine-to-machine (M2M) communication, such as Machine Type Communication (MTC), and/or another type of M2M communication for IoT applications.

RAN 130 may include base stations 120. Base station 120 may enable UE device 110 to communicate with core network 140. Base station 120 may be configured for one or more Radio Access Technology (RAT) types. For example, base station 120 may include a 5G New Radio (NR) base station (e.g., a gNodeB) and/or a 4G Long Term Evolution (LTE) base station (e.g., an eNodeB). Each base station 120 may include devices and/or components to enable cellular wireless communication with UE devices 110. For example, base station 120 may cover a set of base station cells, also referred to as base station sectors. That is, each cell may cover a sector (e.g., a 120° sector, etc.). Base station 120 include a radio frequency (RF) transceiver configured to send and receive wireless signals in the direction of the sector and be configured to communicate with UE devices 110 using a 5G NR air interface, a 4G LTE air interface, and/or using another type of cellular air interface.

Core network 140 may be managed by a provider of cellular wireless communication services and may manage communication sessions of subscribers connecting to core network 140 via RAN 130. For example, core network 140 may establish an Internet Protocol (IP) connection between UE devices 110 and PDN 150. In some implementations, core network 140 may include a 5G core network. In other implementations, core network 140 may include a 4G core network (e.g., an evolved packet core (EPC) network).

The components of core network 140 may be implemented as dedicated hardware components or as virtualized functions implemented on top of a common shared physical infrastructure using Software Defined Networking (SDN). For example, an SDN controller may implement one or more of the components of core network 140 using an adapter implementing a Virtual Network Function (VNF) virtual machine, a CNF container, an event driven serverless architecture interface, and/or another type of SDN component. The common shared physical infrastructure may be implemented using one or more devices 300 described below with reference to FIG. 3 in a cloud computing center associated with core network 140. Exemplary components of core network 140 are described below with reference to FIG. 2.

PDNs 150-A to 150-Y may each include a PDN connected to core network 140. A particular PDN 150 may be associated with a DNN in 5G, and/or an APN in 4G, and a UE device may request a connection to PDN 150 using the DNN or APN. PDN 150 may include, and/or be connected to and enable communication with, a local area network (LAN), a wide area network (WAN), a metropolitan area network (MAN), an autonomous system (AS) on the Internet, an optical network, a cable television network, a satellite network, another wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks. PDN 150 may include an application server 160 (shown in PDN 150-A in FIG. 1). Application server 160 may provide services for an application running on UE device 110 and may establish an application session with UE device 110 via an SME in core network 140.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
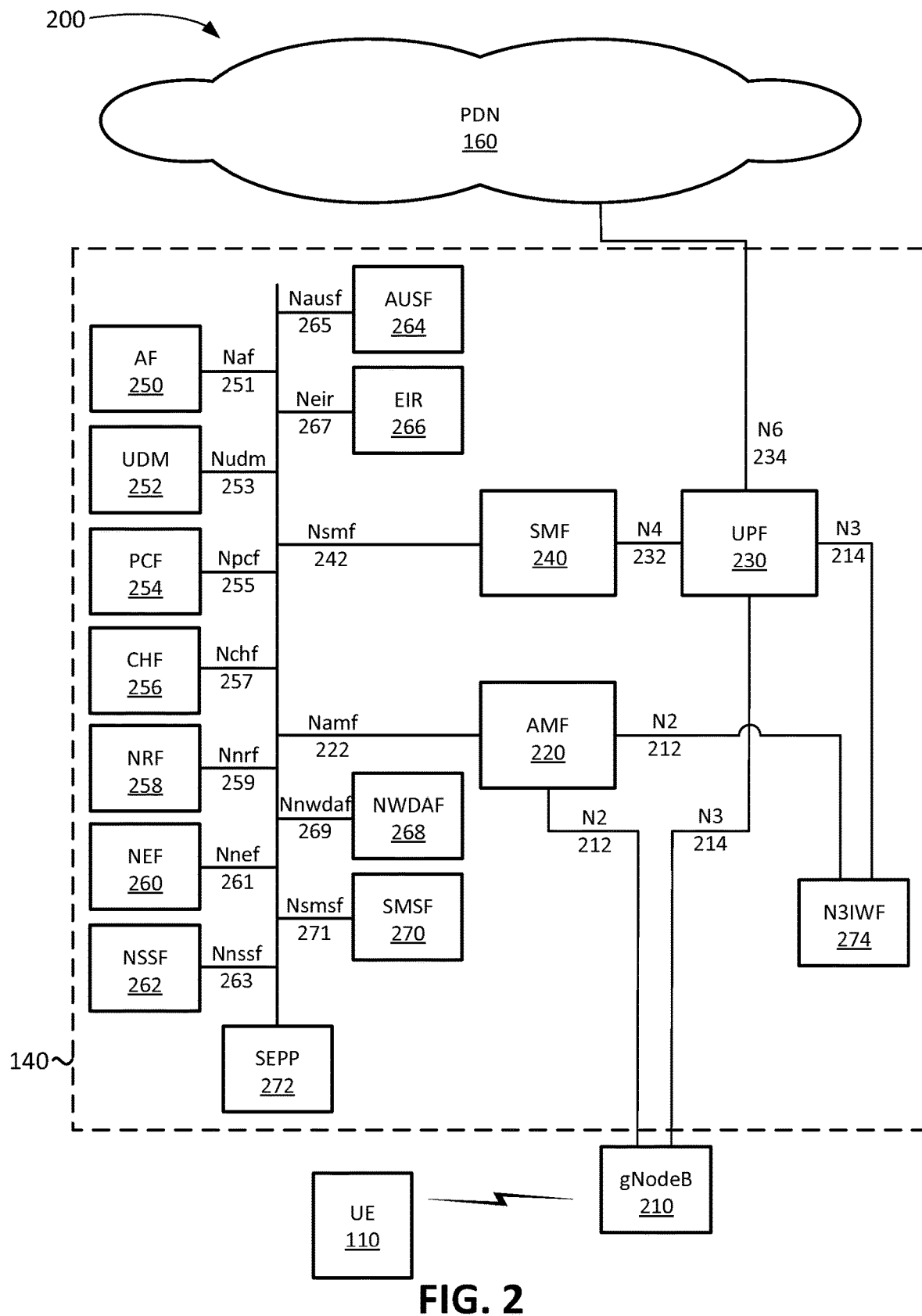
FIG. 2 illustrates exemplary components of a Fifth Generation (5G) core network according to an implementation described herein.

FIG. 2 illustrates a system 200 that includes exemplary components of core network 140 in the context of environment 100 according to an implementation described herein in which core network 140 includes a 5G core network. As shown in FIG. 2, system 200 may include UE device 110, gNodeB 210, core network 140, and PDN 150.

gNodeB 210 (corresponding to base station 120) may include devices and components that enable UE device 110 to connect to core network 140 via RAN 130 using 5G NR RAT. For example, gNodeB 210 may service one or more cells, with each cell being served by a wireless transceiver with an antenna array configured for mm-wave wireless communication. gNodeB 210 may communicate with AMF 220 using an N2 interface 212 and communicate with UPF 230 using an N3 interface 214.

Core network 140 may include an Access and Mobility Function (AMF) 220, a User Plane Function (UPF) 230, an SMF 240, a UDSF 245, an Application Function (AF) 250, a Unified Data Management (UDM) 252, a Policy Control Function (PCF) 254, a Charging Function (CHF) 256, a Network Repository Function (NRF) 258, a Network Exposure Function (NEF) 260, a Network Slice Selection Function (NSSF) 262, an Authentication Server Function (AUSF) 264, a 5G Equipment Identity Register (EIR) 266, a Network Data Analytics Function (NWDAF) 268, a Short Message Service Function (SMSF) 270, a Security Edge Protection Proxy (SEPP) 272, and a Non-3GPP Inter-Working Function (N3IWF) 274.

While FIG. 2 depicts a single AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, and N3IWF 274 for illustration purposes, in practice, core network 140 may include multiple AMFs 220, UPFs 230, SMFs 240, AFs 250, UDMs 252, PCFs 254, CHFs 256, NRFs 258, NEFs 260, NSSFs 262, AUSFs 264, EIRs 266, NWDAFs 268, SMSFs 270, SEPPs 272, and/or N3IWFs 274.

AMF 220 may perform registration management, connection management, reachability management, mobility management, lawful intercepts, Short Message Service (SMS) transport between UE device 110 and SMSF 270, transport of session management messages between UE device 110 and SMF 240, access authentication and authorization, location services management, functionality to support non-3GPP access networks, and/or other types of management processes. AMF 220 may be accessible by other function nodes via an Namf interface 222.

UPF 230 may maintain an anchor point for intra/inter-RAT mobility, maintain an external Packet Data Unit (PDU) point of interconnect to a particular data network (e.g., PDN 150), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, and/or perform other types of user plane processes. UPF 230 may communicate with SMF 240 using an N4 interface 232 and connect to PDN 160 using an N6 interface 234.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate charging data collection, terminate session management parts of Non-Access Stratum (NAS) messages, perform downlink data notification, manage roaming functionality, and/or perform other types of control plane processes for managing user plane data. SMF 240 may be accessible via an Nsmf interface 242.

AF 250 may provide services associated with a particular application, such as, for example, an application for influencing traffic routing, an application for accessing NEF 260, an application for interacting with a policy framework for policy control, and/or other types of applications. AF 250 may be accessible via an Naf interface 251, also referred to as an NG5 interface.

UDM 252 may maintain subscription information for UE devices 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 253.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 255. PCF 254 may activate QoS monitoring for a communication session based on a trigger condition and instruct SMF 240 to perform QoS monitoring for the communication session. PCF 254 may collect QoS monitoring reports from SMFs 240 and send batch reports of the collected QoS monitoring reports to AF 250 and/or NEF 260. CHF 256 may perform charging and/or billing functions for core network 140. For example, CHF 256 may generate a charging record for UE device 110 based on data flow information associated with UE device 110. CHF 256 may be accessible via Nchf interface 257.

NRF 258 may support a service discovery function and maintain profiles of available network function (NF) instances and their supported services. An NF profile may include, for example, an NF instance identifier (ID), an NF type, a Public Land Mobile Network (PLMN) ID associated with the NF, network slice IDs associated with the NF, capacity information for the NF, service authorization information for the NF, information identifying supported services associated with the NF, endpoint information for each supported service associated with the NF, and/or other types of NF information. NRF 258 may be accessible via an Nnrf interface 259.

NEF 260 may expose capabilities and events to other NFs, including $3^{rd}$ party NFs, AFs, edge computing NFs, and/or other types of NFs. Furthermore, NEF 260 may secure provisioning of information from external applications to core network 140, translate information between core network 140 and devices/networks external to core network 140, support a Packet Flow Description (PFD) function, and/or perform other types of network exposure functions. NEF 260 may be accessible via Nnef interface 261.

NSSF 262 may select a set of network slice instances to serve a particular UE device 110, determine network slice selection assistance information (NSSAI) or a Single-NSSAI (S-NSSA), determine a particular AMF 220 to serve a particular UE device 110, and/or perform other types of processing associated with network slice selection or management. NSSF 262 may be accessible via Nnssf interface 263.

AUSF 264 may perform authentication. For example, AUSF 264 may implement an Extensible Authentication Protocol (EAP) authentication server and may store authentication keys for UE devices 110. AUSF 264 may be accessible via Nausf interface 265. EIR 266 may authenticate a particular UE device 110 based on UE device identity, such as a Permanent Equipment Identifier (PEI). For example, EIR 266 may check to determine if a PEI has been blacklisted. EIR 266 may be accessible via Neir interface 267.

NWDAF 268 may collect analytics information associated with radio access network 120 and/or core network 140. For example, NWDAF 268 may collect accessibility Key Performance Indicators (KPIs) (e.g., a Radio Resource Control (RRC) connection setup success rate, a Radio Access Bearer (RAB) success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), and/or other types of wireless network KPIs.

SMSF 270 may perform SMS services for UE devices 110. SMSF 270 may be accessible via Nsmsf interface 271. SEPP 272 may implement application layer security for all layer information exchanged between two NFs across two different PLMNs. N3IWF 274 may interconnect to a non-3GPP access device, such as, for example, a WiFi Access Point. N3IWF 274 may facilitate handovers for UE device 110 between RAN 130 and the non-3GPP access device. N3IWF 274 may be accessible via Nn3iwf interface 275.

Although FIG. 2 shows exemplary components of core network 140, in other implementations, core network 140 may include fewer components, different components, differently arranged components, or additional components than depicted in FIG. 2. Additionally, or alternatively, one or more components of core network 140 may perform functions described as being performed by one or more other components of core network 140. For example, core network 140 may include additional function nodes not shown in FIG. 2, such as a Unified Data Repository (UDR), an Unstructured Data Storage Network Function (UDSF), a Location Management Function (LMF), a Lawful Intercept Function (LIF), a Binding Session Function (BSF), and/or other types of functions. Furthermore, while particular interfaces have been described with respect to particular function nodes in FIG. 2, additionally, or alternatively, core network 140 may include a reference point architecture that includes point-to-point interfaces between particular function nodes.

Figure 3:
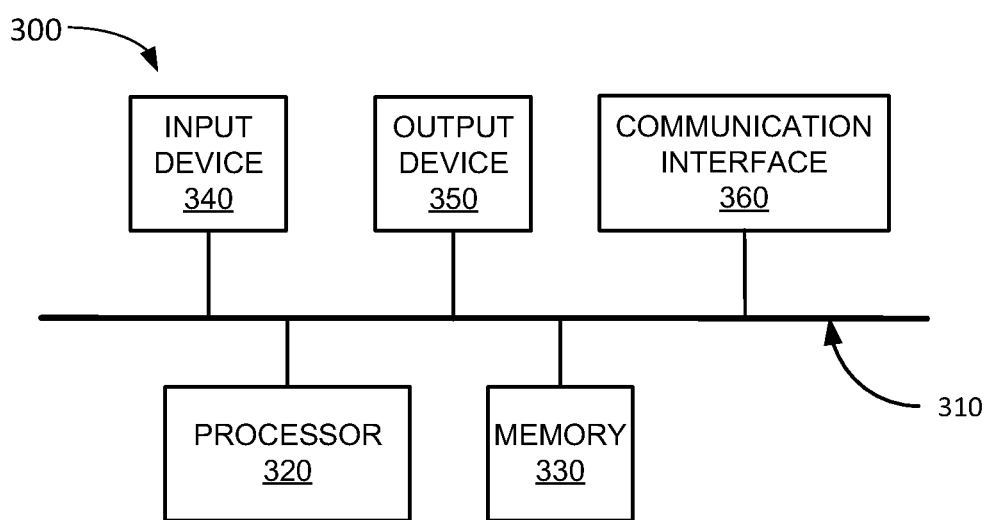
FIG. 3 is a diagram illustrating exemplary components of a device that may be included in a component of an environment according to an implementation described herein.

FIG. 3 illustrates example components of a device 300 according to an implementation described herein. UE device 110, application server 160, gNodeB 210, AMF 220, UPF 230, SMF 240, AF 250, UDM 252, PCF 254, CHF 256, NRF 258, NEF 260, NSSF 262, AUSF 264, EIR 266, NWDAF 268, SMSF 270, SEPP 272, N3IWF 274, and/or other components of core network 140, may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to activating QoS monitoring and/or batch reporting of QoS monitoring reports. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
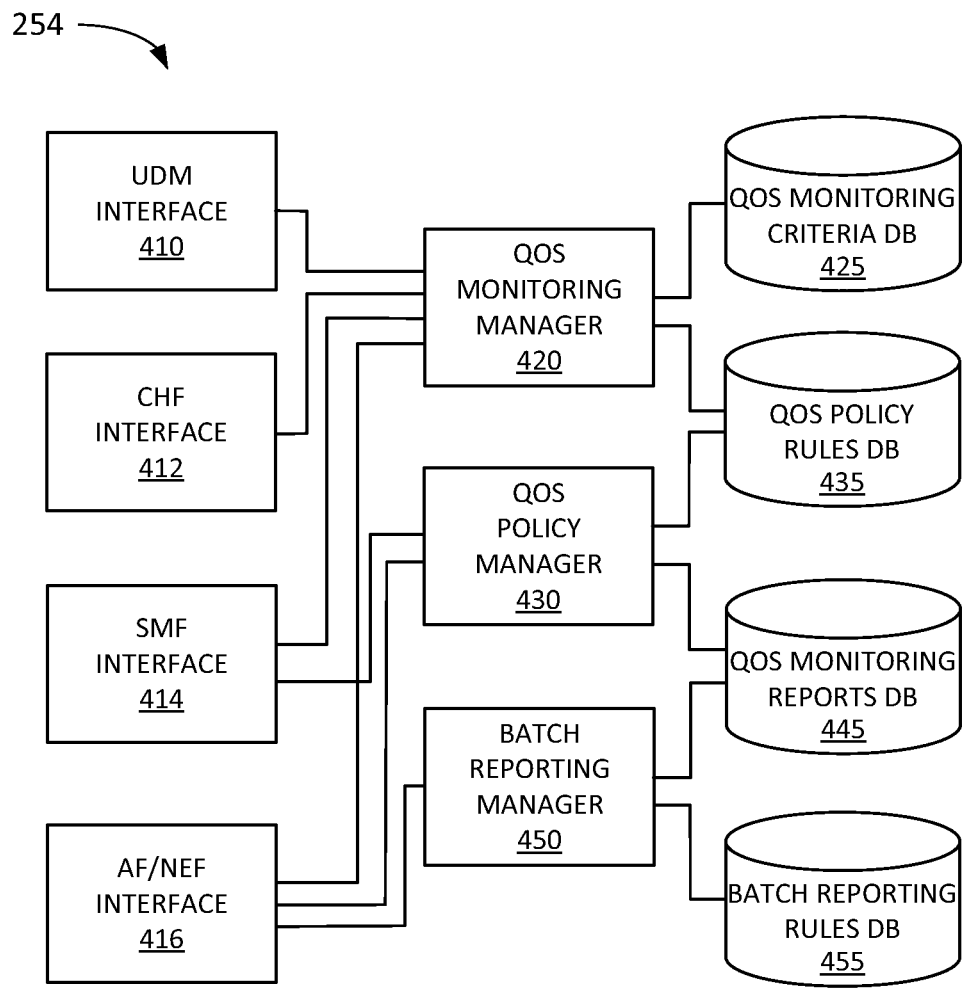
FIG. 4 is a diagram illustrating exemplary components of a Policy Control Function (PCF) device according to an implementation described herein.

FIG. 4 is a diagram illustrating exemplary components of PCF 254. The components of PCF 254 may be implemented, for example, via processor 320 executing instructions from memory 330. Alternatively, some or all of the components of PCF 254 may be implemented via hard-wired circuitry. As shown in FIG. 4, PCF 254 may include a UDM interface 410, a CHF interface 412, an SMF interface 414, an AF/NEF interface 416, a QoS monitoring manager 420, a QoS monitoring criteria database (DB) 425, a QoS policy manager 430, a QoS policy rules DB 435, a QoS monitoring reports DB 445, a batch reporting manager 450, and a batch reporting rules DB 455.

UDM interface 410 may be configured to communicate with UDM 252. For example, UDM interface 410 may receive a subscriber update from UDM 252 indicating that QoS monitoring is to be used for communication sessions associated with a subscriber. CHF interface 412 may be configured to communicate with CHF 256. For example, CHF interface 412 may receive a request from CHF 256 to activate QoS monitoring for a particular communication session.

SMF interface 414 may be configured to communicate with SMF 240. For example, SMF interface 414 may receive a request from SMF 240 for a policy for a communication session, send a QoS monitoring policy to SMF 240, and/or receive a QoS monitoring report based on the QoS monitoring policy and store the received QoS monitoring report in QoS monitoring reports DB 445. AF/NEF interface 416 may be configured to communicate with AF 250 and/or NEF 260. For example, AF/NEF interface 416 may receive a request to perform QoS monitoring for a communication session from AF 250 and/or NEF 260. Furthermore, AF/NEF interface 416 may send a batch report that includes information from multiple QoS monitoring reports to AF 250 and/or NEF 260.

QoS monitoring manager 420 may manage QoS monitoring for communication sessions for which PCF 254 handles policies. As an example, QoS monitoring manager 420 may receive a policy authorization request from AF 250 or from NEF 260. The request may instruct PCF 254 to monitor a communication session for one or more QoS parameters. As another example, QoS monitoring manager 420 may determine to activate QoS monitoring for a communication session based on a trigger criterion. QoS monitoring criteria DB 425 may store information relating to trigger criteria for initiating QoS monitoring for a communication session. Exemplary information that may be stored in QoS monitoring criteria DB 425 is described below with reference to FIG. 5A. QoS monitoring manager 420 may send a QoS monitoring request to SMF 240 based the trigger criterion. The QoS monitoring request may identify one or more QoS parameters, for which SMF 240 is to collect values for the communication session, and identify a frequency at which to collect the values.

QoS policy manager 430 may manage QoS policies for communication sessions. For example, QoS policy manager 430 may select an action based on a received QoS monitoring report and perform the selected action. QoS policy rules DB 435 may store information relating to actions that are to be taken based on information received in a QoS monitoring report. Exemplary information that may be stored in QoS policy rules DB 435 is described below with reference to FIG. 5B. The action to be taken may include reporting the QoS monitoring report to AF 250 or NEF 260, adding the QoS monitoring report to a batch report to be sent to AF 250 or NEF 260 at a later time, and/or applying a policy to the communication session, such as changing a QoS class for the communication session, instructing the SMF to collect additional QoS information relating to the communication session, instructing the SMF to transfer the communication session to a particular UPF, assigning the communication session to a particular network slice, etc.

QoS monitoring reports DB 445 may store information relating to QoS monitoring reports received from SMF 240. For example, for each QoS monitoring report received by PCF 254, QoS monitoring reports DB 445 may store a record that includes information identifying a communication session associated with the QoS monitoring report, information identifying UE device 110 associated with the communication session, information identifying a QoS class associated with the communication session, information identifying one or more parameters associated with the communication session, and/or information identifying values for one or more QoS parameters collected by UPF 230 and provided to SMF 240 to include in the QoS monitoring report. The QoS parameters may include uplink delay, downlink delay, round-trip delay, packet loss rate, jitter rate, throughput rate, and/or another QoS parameter associated with the communication session.

Batch reporting manager 450 may manage batch reporting of QoS monitoring reports based on one or more batch reporting rules stored in batch reporting rules DB 455. A batch reporting rule may specify a reporting trigger condition for sending a batch report to AF 250 or to NEF 260. A trigger condition may include a data size threshold. For example, when the size of accumulated data included in received QoS monitoring reports (e.g., received since a most recent batch report was sent) reaches the data size threshold, batch reporting manager 450 may generate a batch report that includes the received QoS monitoring reports and send the batch report to AF 250 or NEF 260. Another trigger condition may include a threshold number of QoS monitoring reports. For example, when PCF 254 receives the threshold number of QoS monitoring reports since a most recent batch report was sent, batch reporting manager 450 may generate a batch report that includes all QoS monitoring reports received since the most recent batch report was sent and send the batch report to AF 250 or NEF 260. Yet another trigger condition may include detecting that a particular time period has elapsed. For example, when a time period since a most recent batch report was sent has elapsed, batch reporting manager 450 may generate a batch report that includes all QoS monitoring reports received since the most recent batch report was sent and send the batch report to AF 250 or NEF 260. A trigger condition may be applied to all QoS monitoring reports received by PCF 254 or to QoS monitoring reports received for a particular subscriber (e.g., a particular UE device 110).

Although FIG. 4 shows exemplary components of PCF 254, in other implementations, PCF 254 may include fewer components, different components, additional components, or differently arranged components than depicted in FIG. 4. Additionally, or alternatively, one or more components of PCF 254 may perform one or more tasks described as being performed by one or more other components of PCF 254.

Figure 5A:
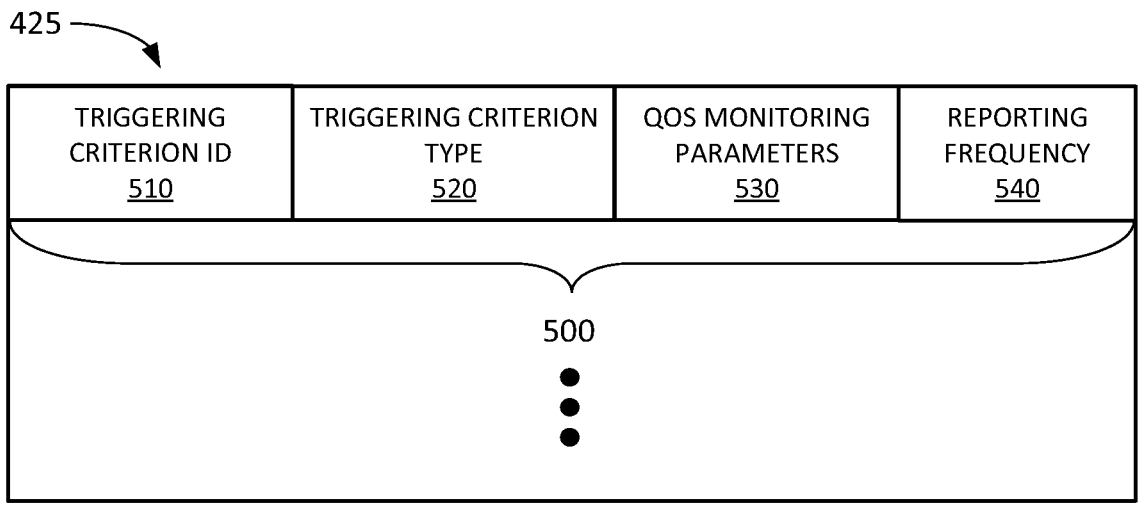
FIG. 5A is a diagram illustrating exemplary components of a Quality of Service (QoS) monitoring criteria database (DB) according to an implementation described herein.

FIG. 5A is a diagram illustrating exemplary components of QoS monitoring criteria DB 425. As shown in FIG. 5A, QoS monitoring criteria DB 425 may include trigger condition records 500. Each trigger condition record 500 may store information relating to a particular trigger condition for triggering QoS monitoring. Trigger condition record 500 may include a triggering criterion identifier (ID) field 510, a triggering criterion type field 520, a QoS monitoring parameters field 530, and a reporting frequency field 540.

Triggering criterion ID field 510 may store an ID associated with a particular triggering criterion. Triggering criterion type field 520 may identify one or more trigger criteria for initiating QoS monitoring for a communication session. As an example, a trigger criterion may include determining that a communication session is associated with a particular subscriber, UE device 110, a QoS class, a network slice, a DNN, gNodeB 210 and/or another parameter or device in RAN 130, core network 140, and/or PDN 150. As another example, a trigger condition may further include receiving, from a CHF, a notification from indicating that QoS monitoring is to be performed for the communication session, receiving a subscriber profile update indicating that QoS monitoring is to be used for communication sessions associated with a subscriber, and/or receiving another notification from a component of core network 140.

QoS monitoring parameters field 530 may identify one or more QoS monitoring parameters that are to be measured for the communication session if the communication session satisfies the particular trigger condition. For example, QoS monitoring parameters field 530 may identify one or more of an uplink delay, a downlink delay, a round-trip delay, a packet loss rate, a jitter rate, a throughput rate, and/or another QoS parameter. Reporting frequency field 540 may store information identifying how frequently to send a QoS monitoring report for the communication session. For example, reporting frequency field 540 may specify that a QoS monitoring report is to be sent once per communication session, at periodic intervals while the communication session is active, as an average of multiple measurements taken while the communication session is active and sent once the communication session is released, and/or another type of reporting frequency.

Although FIG. 5A shows exemplary components of QoS monitoring criteria DB 425, in other implementations, QoS monitoring criteria DB 425 may include fewer components, different components, additional components, or differently arranged components than depicted in FIG. 5A.

Figure 5B:
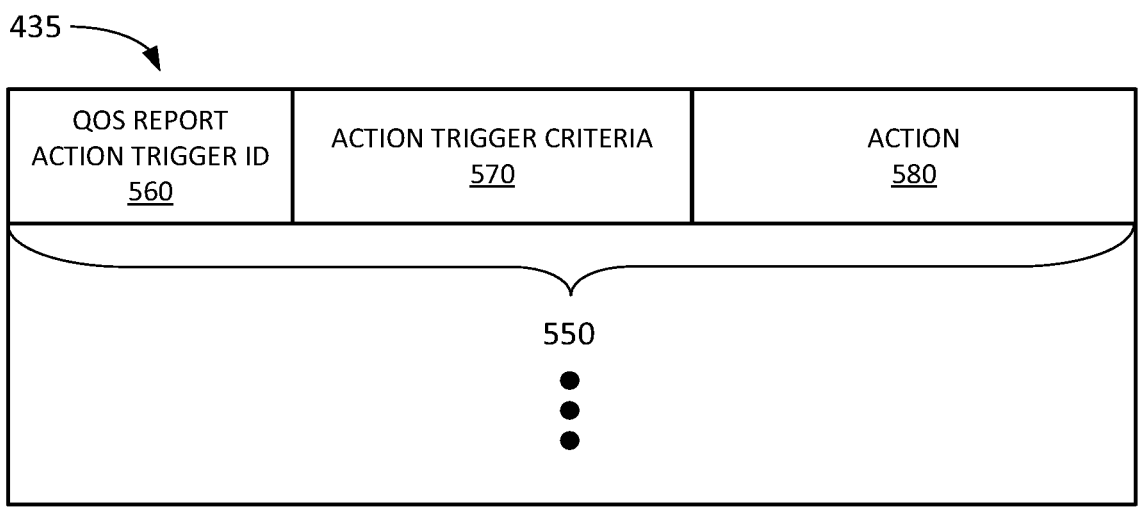
FIG. 5B is a diagram illustrating exemplary components of a QoS policy rules DB according to an implementation described herein.

FIG. 5B is a diagram illustrating exemplary components of QoS policy rules DB 435. As shown in FIG. 5B, QoS policy rules DB 435 may include action records 550. Each action record 550 may store information relating to a particular action to take in response to information included in a received QoS monitoring report. Action record 550 may include a QoS report action trigger ID field 560, an action trigger criteria field 570, and an action field 580.

QoS report action trigger ID field 560 may include an ID associated with a particular action trigger. Action trigger criteria field 570 may store information identifying one or more criteria for the particular action trigger. The criteria may include, for example, a threshold or range of values for a particular QoS parameter for a type of communication session. Action field 580 may identify actions to be performed if the criteria included in action trigger criteria field 750 are satisfied. The action may include, for example, the actions described above with respect to QoS policy manager 430.

Although FIG. 5B shows exemplary components of QoS policy rules DB 435, in other implementations, QoS policy rules DB 435 may include fewer components, different components, additional components, or differently arranged components than depicted in FIG. 5B.

Figure 6:
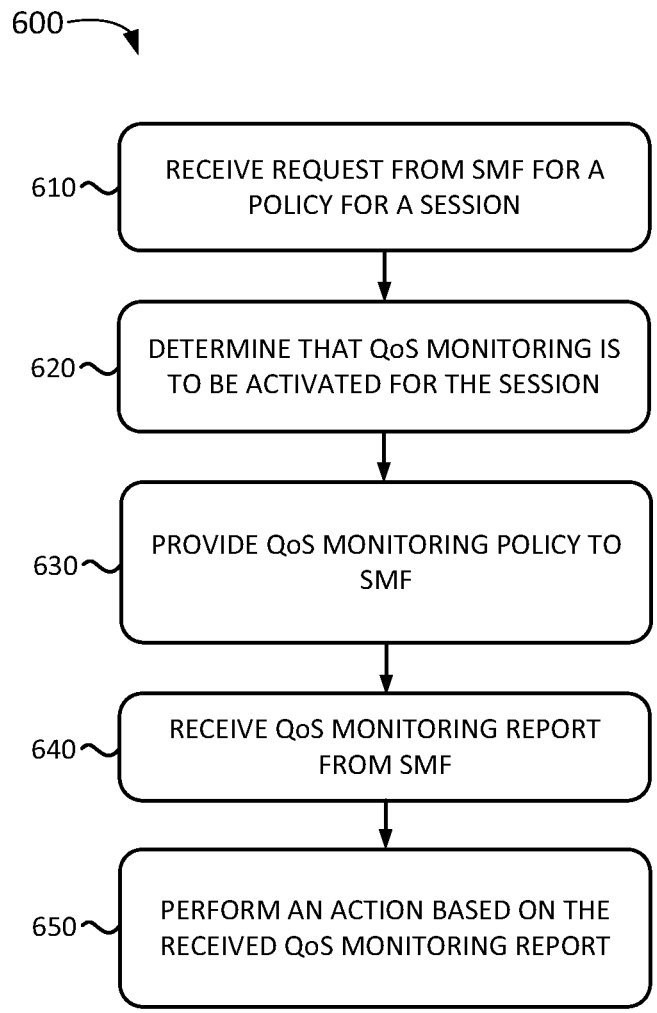
FIG. 6 illustrates a flowchart for initiating QoS monitoring according to an implementation described herein.

FIG. 6 illustrates a flowchart for initiating QoS monitoring according to an implementation described herein. In some implementations, process 600 of FIG. 6 may be performed by PCF 254. In other implementations, some or all of process 600 may be performed by another device or a group of devices.

As shown in FIG. 6, process 600 may include receiving a request from an SMF for a policy for a session (block 610) and determining that QoS monitoring is to be activated for the session (block 620). For example, SMF 240 may, during the establishment of a communication session, send a policy request to PCF 254 for a policy to apply to the communication session. In response, PCF 254 may determine that QoS monitoring is to be activated for the communication session by determining that a QoS monitoring criterion in QoS monitoring criteria DB 425 is satisfied. As an example, PCF 254 may determine that the communication session is associated with a subscriber for whom QoS monitoring is to be performed. As another example, PCF 254 may determine that the communication session is associated with a DNN for which QoS monitoring is to be performed.

Process 600 may further include providing a QoS monitoring policy to the SMF (block 630), receiving a QoS monitoring report from the SMF (block 640), and performing an action based on the received QoS monitoring report (block 650). For example, PCF 254 may send a QoS monitoring request to SMF 240, receive a QoS monitoring report in response, and perform an action based on information stored in QoS policy rules DB 435. For example, PCF 254 may send the QoS monitoring report to AF 250 or NEF 260, add the QoS monitoring report to a batch report to be sent to AF 250 or NEF 260 at a later time, and/or apply a policy to the communication session, such as changing a QoS class for the communication session, instructing the SMF to collect additional QoS information relating to the communication session, instructing the SMF to transfer the communication session to a particular UPF, assigning the communication session to a particular network slice, etc.

Figure 7:
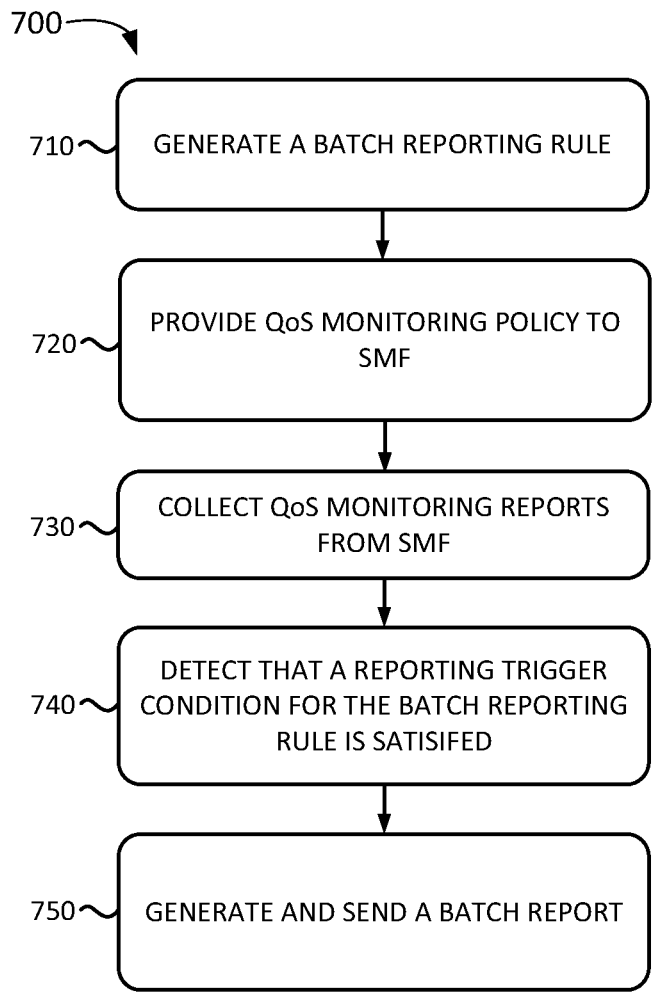
FIG. 7 illustrates a flowchart for batch reporting of QoS monitoring reports according to an implementation described herein.

FIG. 7 illustrates a flowchart for batch reporting of QoS monitoring reports according to an implementation described herein. In some implementations, process 700 of FIG. 7 may be performed by PCF 254. In other implementations, some or all of process 700 may be performed by another device or a group of devices.

As shown in FIG. 7, process 700 may include generating a batch reporting rule (block 710). For example, an administrator may define a batch reporting rule and store the batch reporting rule in batch reporting rules DB 455. The batch reporting rule may specify a trigger for generating a batch report of multiple QoS monitoring reports to send to AF 250 or NEF 260. The trigger may include, for example, a data size threshold for total data accumulated in received QoS monitoring reports, a threshold number of received QoS monitoring reports, a passage of a particular length of time since a previous batch report was sent, and/or another type of trigger condition that applies to all received QoS monitoring reports or to QoS monitoring reports received for a particular subscriber or UE device 110.

Process 700 may further include providing a QoS monitoring policy to an SMF (block 720) and collecting QoS monitoring reports from the SMF (block 730). For example, PCF 254 may provide a QoS monitoring policy to SMFs 240 for communication sessions. PCF 254 may collect QoS monitoring reports from the SMF s 240 for the communication sessions over a period of time.

Process 700 may further include detecting that a reporting trigger condition for the batch reporting rule is satisfied (block 740) and generating and sending a batch report in response (block 750). As an example, PCF 254 may determine that a particular number of QoS monitoring reports have been received for a particular UE device 110 and may generate a batch report that includes QoS parameter values from all the QoS monitoring reports and send the batch report to NEF 260. NEF 260 may forward the batch report to application server 160. As another example, PCF 254 may determine that a particular time period has passed since the last batch report was sent to AF 250 for UE device 110. In response, PCF 254 may generate a batch report that includes QoS parameter values from all the QoS monitoring reports received since the last batch report and send the batch report to AF 250.

Figure 8:
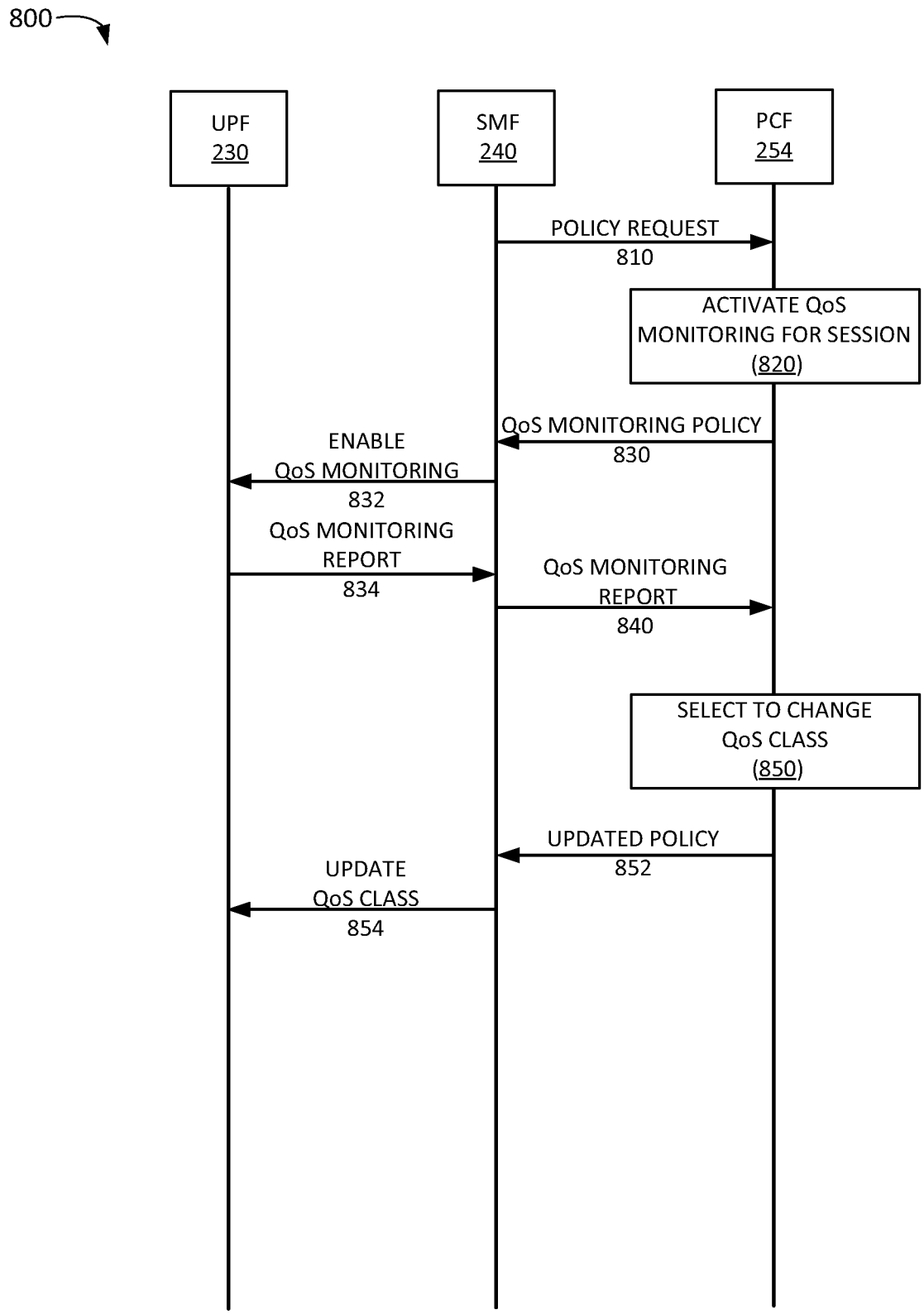
FIG. 8 illustrates a first exemplary signal flow according to an implementation described herein.

FIG. 8 illustrates an exemplary signal flow 800 according to an implementation described herein. Signal flow 800 illustrates QoS monitoring initiated by PCF 254. As shown in FIG. 8, signal flow 800 may include SMF 240 sending a policy request to PCF 254 for a communication session managed by SMF 240 (signal 810). In response, PCF 254 may activate QoS monitoring for the communication session based on identifying UE device 110 is associated with the communication session and determining QoS monitoring is to be activated for communication session associated with UE device 110. PCF 254 may send a QoS monitoring policy that specifies one or more QoS parameters to monitor for the communication session (signal 830). SMF 240 may enable QoS monitoring with UPF 230 managing the communication session (signal 832). UPF 230 may measure values for the one or more QoS parameters, such as uplink delay, downlink delay, roundtrip delay, etc., for the communication session and provide the measured values to SMF 240 (signal 834). SMF 240 may generate a QoS monitoring report and send the QoS monitoring report to PCF 254 (signal 840).

Assume that the QoS monitoring report includes a latency value that is larger than a latency requirement associated with the communication session. Therefore, the communication session may not be meeting the latency requirement. Thus, based on the received QoS monitoring report, PCF 254 may select an action to adjust the QoS class for the communication session to a higher QoS class (block 850) and send an updated policy to SMF 240 (signal 852) and SMF 240 may apply the updated policy to UPF 230 (signal 854).

While FIG. 8 illustrates a situation in which PCF 254 send a QoS monitoring request to SMF 240 when a communication session is established, in other situations PCF 254 may send a QoS monitoring request/policy to SMF 240 after a communication session has been established and is running (e.g., in mid-session, etc.). For example, PCF 254 may receive a subscriber profile change from UDR via UDM 252 while in mid-session, and the subscriber profile change may indicate that QoS monitoring is to be used for the subscriber for communication sessions of a particular type. In response, PCF 254 may send the QoS monitoring policy to SMF 240 while the communication session is running.

Figure 9:
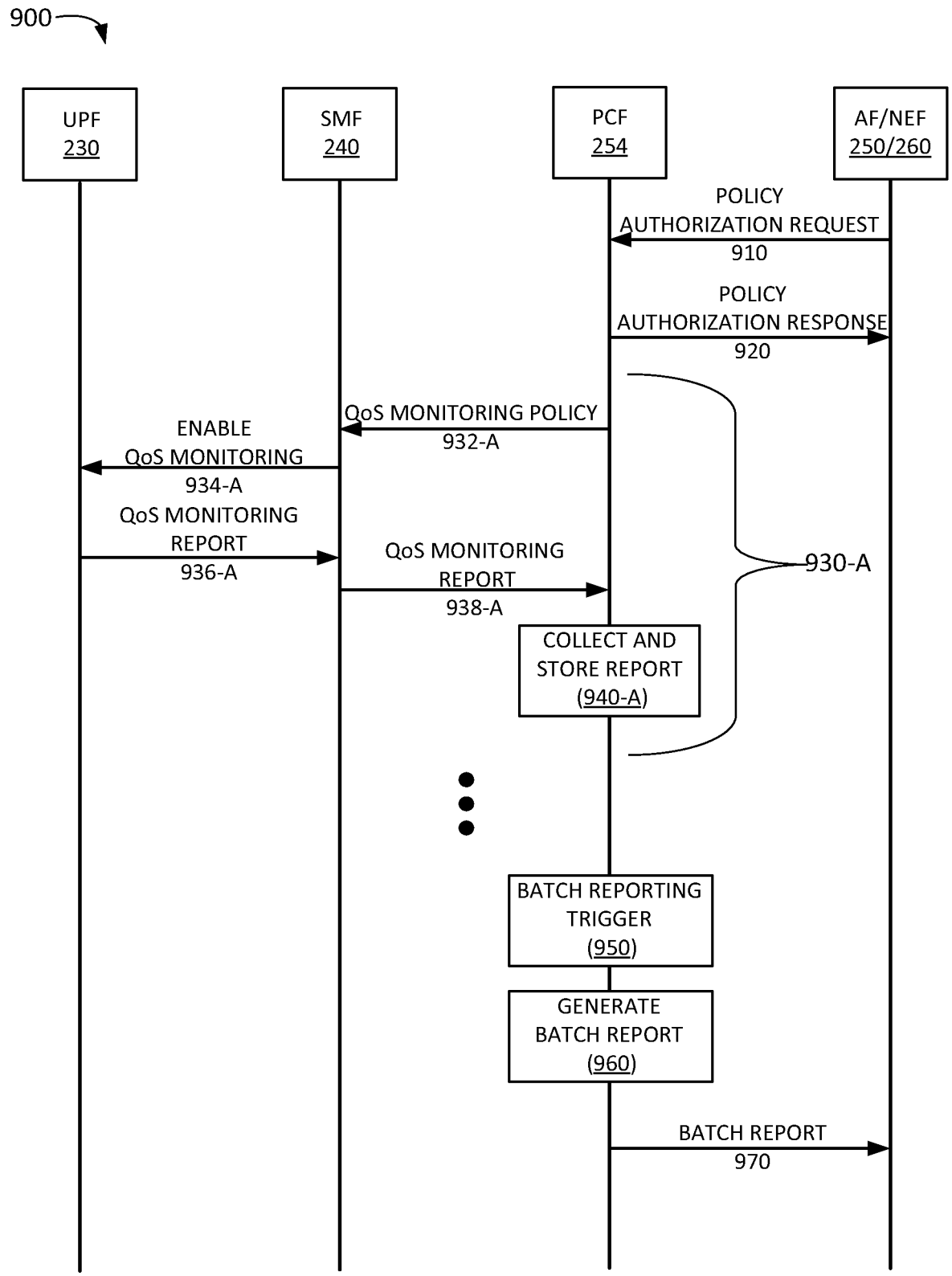
FIG. 9 illustrates a second exemplary signal flow according to an implementation described herein.

FIG. 9 illustrates another first exemplary signal flow 900 according to an implementation described herein. Signal flow 900 illustrates batch reporting of QoS monitoring reports. As shown in FIG. 9, signal flow 900 may include AF 250 or NEF 260 sending a policy authorization request to PCF 254 to initiate QoS monitoring for a communication session (signal 910). PCF 254 may respond with a policy authorization response acknowledging receipt of the request (signal 920).

PCF 254 may then, in response, collect a QoS monitoring report (item 930-A). Collecting a QoS monitoring report may include PCF 254 providing a QoS monitoring policy to SMF 240 (signal 932-A), SMF 240 enabling QoS monitoring with UPF 20 handling the communication session (signal 934-A), receiving a QoS monitoring report from UPF 230 (signal 936-A), forwarding the QoS monitoring report to PCF 254 (signal 938-A), and collecting and storing the QoS monitoring report (block 940-A).

PCF 254 may collect and store multiple QoS monitoring reports until batch reporting is triggered (block 950). In response, PCF 254 may generate a batch report that includes the QoS parameter values from the collected QoS monitoring reports (block 960) and send the batch report to AF 250 or NEF 260 (signal 970).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, and a series of signals have been described with respect to FIGS. 8 and 9, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   determining, by a device, that Quality of Service (QOS) monitoring is to be performed for a communication session;
   generating, by the device, a QoS monitoring policy for the communication session;
   providing, by the device, the QoS monitoring policy to a Session Management Function (SMF) associated with the communication session;
   receiving, by the device, a QoS monitoring report for the communication session from the SMF; and
   performing, by the device, an action based on the received QoS monitoring report,
   wherein determining that QoS monitoring is to be performed for the communication session includes at least one of:
   receiving, from a Charging Function (CHF), a notification indicating that QoS monitoring is to be performed for the communication session;
   receiving, from a Unified Data Management (UDM), a subscriber profile update indicating that a subscriber associated with the communication session is to receive QoS monitoring; or
   determining that QoS monitoring is to be established for communication sessions associated with a particular Data Network Name (DNN).

2. The method of claim 1, wherein the device includes a Policy Control Function (PCF).

3. The method of claim 1, wherein the QoS monitoring policy instructs the SMF to measure at least one of:
   an uplink delay,
   a downlink delay,
   a round-trip delay,
   a packet loss rate,
   a jitter rate, or
   a throughput rate.

4. The method of claim 1, wherein performing the action based on the received QOS monitoring report includes at least one of:
   sending the received QoS monitoring report to an Application Function (AF) or a Network Exposure Function (NEF); or
   applying a policy to the SMF based on the received QoS monitoring report.

5. The method of claim 4, wherein applying the policy to the SMF based on the received QoS monitoring report includes at least one of:
   changing a QoS class for the communication session;
   instructing the SMF to collect additional QoS information relating to the communication session;
   instructing the SMF to transfer the communication session to a particular User Plane Function (UPF); or
   assigning the communication session to a particular network slice.

6. The method of claim 1, further comprising:
   collecting a plurality of QoS monitoring reports from one or more SMFs; and
   reporting the plurality of QoS monitoring reports to an Application Function (AF) or a Network Exposure Function (NEF) in a batch report.

7. The method of claim 6, wherein reporting the plurality of QoS monitoring reports to the AF or NEF in a batch report includes:
   generating a batch reporting rule, wherein the batch reporting rule includes a reporting trigger condition;
   detecting that the reporting trigger condition is satisfied; and
   sending the batch report to the AF or NEF, in response to detecting that the reporting trigger condition is satisfied.

8. The method of claim 7, wherein detecting that the reporting trigger condition is satisfied includes at least one of:
   detecting that a size of data included in the plurality of QoS monitoring reports has reached a data size threshold;
   detecting that a particular time period has elapsed; or
   detecting that a particular number of QoS monitoring reports have been received for a particular subscriber.

9. A device comprising:
   a processor configured to:
   determine that Quality of Service (QOS) monitoring is to be performed for a communication session;
   generate a QoS monitoring policy for the communication session;
   provide the QoS monitoring policy to a Session Management Function (SMF) associated with the communication session;
   receive a QoS monitoring report for the communication session from the SMF; and
   perform an action based on the received QoS monitoring report,
   wherein when determining that QoS monitoring is to be performed for the communication session, the processor is further configured to at least one of:
   receive, from a Charging Function (CHF), a notification indicating that QoS monitoring is to be performed for the communication session;

receive, from a Unified Data Management (UDM), a subscriber profile update indicating that a subscriber associated with the communication session is to receive QoS monitoring; or determine that QoS monitoring is to be established for communication sessions associated with a particular Data Network Name (DNN).

10. The device of claim 9, wherein the device includes a Policy Control Function (PCF).

11. The device of 9, wherein the QoS monitoring policy instructs the SMF to measure at least one of:
an uplink delay,
a downlink delay,
a round-trip delay,
a packet loss rate,
a jitter rate, or
a throughput rate.

12. The device of claim 9, wherein, when performing the action based on the received QoS monitoring report, the processor is further configured to at least one of:
send the received QoS monitoring report to an Application Function (AF) or a Network Exposure Function (NEF); or
apply a policy to the SMF based on the received QoS monitoring report.

13. The device of claim 12, wherein, when applying the policy to the SMF based on the received QoS monitoring report, the processor is further configured to at least one of:
change a QoS class for the communication session;
instruct the SMF to collect additional QoS information relating to the communication session;
instruct the SMF to transfer the communication session to a particular User Plane Function (UPF); or
assign the communication session to a particular network slice.

14. The device of claim 9, wherein the processor is further configured to:
collect a plurality of QoS monitoring reports from one or more SMFs; and
report the plurality of QoS monitoring reports to an Application Function (AF) or a Network Exposure Function (NEF) in a batch report.

15. The device of claim 14, wherein, when reporting the plurality of QoS monitoring reports to the AF or NEW in a batch report, the processor is further configured to:
generate a batch reporting rule, wherein the batch reporting rule includes a reporting trigger condition;
detect that the reporting trigger condition is satisfied; and
send the batch report to the AF or NEF, in response to detecting that the reporting trigger condition is satisfied.

16. The device of claim 15, wherein, when detecting that the reporting trigger condition is satisfied, the processor is further configured to at least one of:
detect that a size of data included in the plurality of QoS monitoring reports has reached a data size threshold;
detect that a particular time period has elapsed; or
detect that a particular number of QoS monitoring reports have been received for a particular subscriber.

17. A non-transitory computer-readable memory device storing instructions executable one a processor, the non-transitory computer-readable memory device comprising:
one or more instructions to determine that Quality of Service (QOS) monitoring is to be performed for a communication session;
one or more instructions to generate a QoS monitoring policy for the communication session;
one or more instructions to provide the QoS monitoring policy to a Session Management Function (SMF) associated with the communication session;
one or more instructions to receive a QoS monitoring report for the communication session from the SMF; and
one or more instructions to perform an action based on the received QoS monitoring report,
wherein the one or more instructions to determine that QoS monitoring is to be performed for the communication session comprise at least one of:
one or more instructions to receive, from a Charging Function (CHF), a notification indicating that QoS monitoring is to be performed for the communication session;
one or more instructions to receive, from a Unified Data Management (UDM), a subscriber profile update indicating that a subscriber associated with the communication session is to receive QoS monitoring; or
one or more instructions to determine that QoS monitoring is to be established for communication sessions associated with a particular Data Network Name (DNN).

18. The non-transitory computer-readable memory device of claim 17, further comprising:
one or more instructions to collect a plurality of QoS monitoring reports from one or more SMFs; and
one or more instructions to report the plurality of QoS monitoring reports to an Application Function (AF) or a Network Exposure Function (NEF) in a batch report.

19. The non-transitory computer-readable memory device of claim 17, wherein the QoS monitoring policy instructs the SMF to measure at least one of:
an uplink delay,
a downlink delay,
a round-trip delay,
a packet loss rate,
a jitter rate, or
a throughput rate.

20. The non-transitory computer-readable memory device of claim 17, wherein the one or more instructions to perform the action based on the received QoS monitoring report includes at least one of:
one or more instructions to send the received QoS monitoring report to an Application Function (AF) or a Network Exposure Function (NEF); or
one or more instructions to apply a policy to the SMF based on the received QoS monitoring report.

\* \* \* \* \*